Jan. 7, 1958 A. W. MASSMAN 2,819,335
COLOR TELEVISION
Filed June 13, 1955
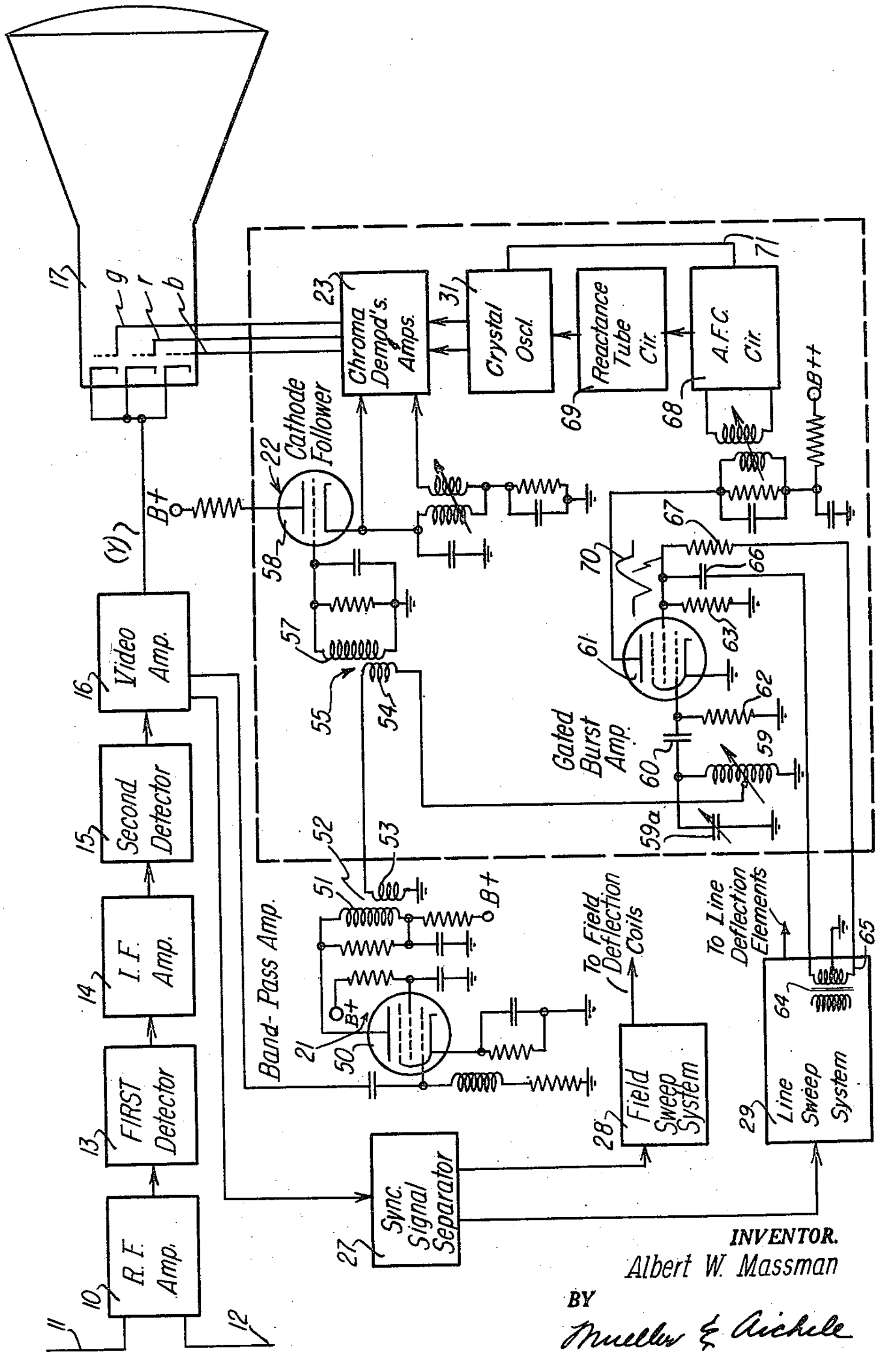
INVENTOR.
Albert W. Massman
BY
Mueller & Aichele
Attys.

United States Patent Office 2,819,335

Patented Jan. 7, 1958

2,819,335

COLOR TELEVISION

Albert W. Massman, Wheaton, Ill., assignor to Motorola, Inc., Chicago, Ill., a corporation of Illinois Application June 13, 1955, Serial No. 515,068

8 Claims. (Cl. 178—5.4)

The present invention relates to color television receivers and more particularly to an improved color television receiver of the type which utilizes the presently standardized color television signal containing a chroma subcarrier component and bursts of a chroma synchronizing reference signal in addition to the monochrome components of a usual black-and-white television signal.

The presently standardized color television signal is one in which separate color video signals are obtained at the transmitter from a suitable picture converting means, these color video signals representing different primary color intensities of the scene to be televised. The color video signals are combined in selected proportions to constitute a monochrome video signal which, in turn, is combined with line and field synchronizing components to form a compatible monochrome television signal which is modulated on a carrier wave. This monochrome television signal is so constituted that it conforms in all respects with present day monochrome standards and can be reproduced in black-and-white in existing monochrome receivers. To enable the scene to be reproduced in suitable color receivers, two of the color video signals are mixed with the monochrome signal at the transmitter to constitute a pair of color-difference video signals, each bearing distinct chroma information. These color-difference signals are amplitude modulated in phase quadrature on a chroma subcarrier, and the subcarrier is, in turn, amplitude modulated on the main carrier with the monochrome television signal.

Full details of a color television system for constituting and utilizing the color television signal described above may be found in the February 1952 edition of "Electronics" published by McGraw-Hill Corp., in an article entitled "Principles of NTSC compatible color television," by W. C. Hirsch et al., at page 88 of that publication. As fully described in the article, it is usual in a tricolor television system to modulate only the blue $(b-y)$ and red $(r-y)$ color-difference signals on the chroma subcarrier, and to reconstitute the green $(g-y)$ color-difference signal at the receiver in a suitable matrix.

The present day standardized color television signal also includes bursts of a chroma synchronizing reference signal of the same frequency as the chroma subcarrier and in phase with one of the color-difference modulation components thereof. These bursts are impressed upon successive line blanking pulses in the color television signal immediately following respective line synchronizing pulses pedestalled on the blanking pulses. The color-difference signals are recovered from the chroma subcarrier by demodulating the subcarrier in a suitable chroma demodulator in the receiver. This demodulator responds to a pair of demodulating or reference signals having the frequency of the subcarrier and respectively having a phase corresponding with respective ones of the color-difference signals modulated thereon. These demodulating signals are usually developed in the receiver by a crystal oscillator that is synchronized with the incoming color television signal by means of the reference bursts referred to above. The present invention is concerned with improved means for selecting the reference bursts from the received color television signal so that they may be supplied to a suitable synchronizing circuit for the crystal oscillator uncontaminated with stray signals, and the like.

It is, accordingly, an object of the present invention to provide in a color television receiver of the type discussed above, an improved system for selecting and isolating the color synchronizing reference bursts from a received color television signal.

Another object of the invention is to provide such an improved system that is constructed to inhibit the pick-up of stray signals and the like, so that the color oscillator will not be subjected to spurious control.

A feature of the invention is the provision in a color television receiver of an improved and simplified system by means of which the synchronizing circuit for the chroma demodulating signal generator is coupled to the selecting circuit for the chroma subcarrier through a low impedance link that is not susceptible to pick up stray signals (such as the chroma demodulating signals, horizontal and vertical synchronizing signals, or video signals), so that improved and interference-free control of this generator may be realized.

Another feature of the invention is the provision in such a system of a gated amplifier including an electron discharge device for selecting the chroma synchronizing reference bursts from a received color television signal, and in which the chroma subcarrier is supplied to the control grid of the device, and a gating signal is applied to the screen electrode thereof, so that full amplification of the reference bursts may be imparted by the device even though the amplitude of the gating signal may change.

Yet another feature of the invention is the provision of such a system in which the gating signal is derived from the output transformer in the horizontal sweep circuit of the receiver, and which gating signal is supplied to the screen of the gated amplifier in the proper phase by means of differentiating and adding circuits.

The above and other features of the invention, which are believed to be new, are set forth with particularity in the appended claims. The invention itself, however, together with further objects and advantages thereof may best be understood by reference to the following description when taken in conjunction with the accompanying drawing in which the single figure shows a color television receiver constructed to incorporate the improved system of the invention.

As previously noted, the present invention finds utility in a color television receiver of the type utilizing a color television signal which includes at least one chroma subcarrier component and which also includes bursts of a reference signal component having a predetermined frequency and phase relation with the subcarrier component. The invention includes a band-pass circuit for selecting the chroma subcarrier component and the reference signal bursts, and the band-pass circuit includes a low impedance output network. The receiver also includes chroma demodulator means with an input transformer having a primary winding of relatively low impedance as compared with the impedance of the secondary winding thereof. Generator means is coupled to the chroma demodulator means for supplying at least one demodulating signal thereto. A further input transformer is provided with a primary winding of relatively low impedance as compared with the impedance of the secondary winding thereof, and means is provided for connecting the primary winding of the input transformers in series across the output network of the bandpass circuit. A gating electron discharge device supplies the reference bursts to the generator and this device includes a control electrode coupled to the secondary winding of the further input transformer, and it also includes a screen electrode. The receiver includes a gating signal source, and means is provided for supplying a gating signal from that source to the screen electrode of the gating discharge device to turn that device on at the proper times so that it selects the reference bursts and supplies them to the generator for synchronizing purposes.

The color television receiver shown in the drawing includes a radio frequency amplifier 10 having input terminals connected to a suitable antenna 11, 12 and having output terminals coupled through a first detector 13 to an intermediate frequency amplifier 14. The intermediate frequency amplifier is coupled to a second detector 15 which, in turn, is coupled to a video amplifier 16. The video amplifier is coupled to the cathodes of a cathode-ray color image reproducing device 17. Device 17 may, for example, be of the tri-gun type and the cathodes of all the guns are tied together and connected to video amplifier 16. The construction of this color image reproducer 17 is well known and of no particular consequence to the present invention, so that a detailed explanation thereof is deemed unnecessary, since its construction does not concern the present invention.

Video amplifier 16 is also coupled to the chroma decoder of the receiver, and this decoder includes a band pass amplifier 21 which is coupled through a cathode follower coupling circuit 22 to a chroma demodulator and amplifier unit 23. Unit 23 is connected by three different leads to the respective control electrodes of the three guns in image reproducer 17. Video amplifier 16 is also coupled to a synchronizing signal separator 27 which, in turn, is connected to a field sweep system 28 and to a line sweep system 29. The field sweep system is coupled to the field deflection elements (not shown) of the image reproducer 17, and the line sweep system 29 is connected to the line deflection elements of the reproducer, which also are not shown.

The receiver also includes a color oscillator 31 for applying demodulating signals to the chroma demodulators in unit 23, the oscillator being controlled by the reference bursts in a manner to be described.

When the receiver is tuned to receive a color television signal intercepted by antenna 11, 12, this signal is amplified by radio frequency amplifier 10 and heterodyned to the selected intermediate frequency of the receiver in first detector 13. The resulting intermediate frequency signal is amplified by intermediate frequency amplifier 14, detected in second detector 15, and the resulting composite video signal is amplified in video amplifier 16.

Only the brightness signal component ($y$) of the composite video signal is developed at the output of video amplifier 16, and this component is supplied with positive phase to the cathodes of reproducer 17.

The chroma subcarrier components and the reference signal bursts of the detector television signal are selected and amplified by band pass amplifier 21 and supplied to the chroma demodulator unit 23 through the cathode-follower coupling circuit 22. The unit 23 responds to the demodulating signals from oscillator 31 to develop the $(b-y)$ and $(r-y)$ color-difference signals, which signals are matrixed to derive the $(g-y)$ color-difference signal. These three color-difference signals are supplied to the respective control grids of color reproducer 17 so that the cathode-ray beams therein may each be modulated by a different one of the three primary color signals.

The sound portion of the color receiver forms no part of the present invention and, for that reason, has not been shown.

The band-pass amplifier 21 of the receiver includes an electron discharge device 50 having an anode connected to the positive terminal B+ through an output network that includes the primary winding 51 of a coupling transformer 52. Transformer 52 also includes a secondary winding 53 having a relatively low impedance as compared with the impedance of the primary winding 51. One side of the secondary winding 53 is connected to a point of reference potential or ground, and the other side of this winding is connected to the primary winding 54 of a coupling transformer 55 through a conductive link 56. The secondary winding 57 of transformer 55 is connected to the control electrode of an electron discharge device 58 which is connected to constitute the cathode-follower circuit 22. The primary winding 54 has a low impedance as compared with the secondary winding 57 of transformer 55, and this transformer is arranged to provide a voltage and impedance step-up to the control grid of cathode follower discharge device 58.

The other side of primary winding 54 is connected to an intermediate tap on an inductive winding 59 which has one side connected to ground and which constitutes an autotransformer with a primary winding between the tap and ground having a relatively low impedance as compared with the secondary winding. The ungrounded side of winding 59 is coupled through a capacitor 60 to the control electrode of an electron discharge device 61, the control electrode being connected to ground through a resistor 62. Winding 59 is shunted by a variable capacitor 59*a* which forms a fine color phase control. The discharge device 61 is connected as a gated burst amplifier, and the device has a cathode connected directly to ground and a suppressor electrode connected to the cathode. The device also has a screen electrode connected to ground through a resistor 63. Line sweep system 29 includes an output transformer 64 which includes a winding 65 having an intermediate tap connected to ground. One side of winding 65 is connected to the screen electrode of device 61 through a capacitor 66 and the other side of the winding 65 is connected to the screen electrode through a resistor 67. The anode of device 61 is coupled to an automatic frequency control circuit 68 which, in turn, is coupled to oscillator 31 through a reactance tube frequency control circuit 69.

The chroma subcarrier components selected by band-pass amplifier 21 appear in its output network and these subcarrier components are supplied to the primary winding 54 and to the primary section of winding 59, which winding and section are series-connected across the secondary winding 53 of output transformer 52. This coupling arrangement has an essentially low impedance so that it is not susceptible to picking up stray signals such as the signal from oscillator 31, the video signals, or the synchronizing signals, and this constitutes a convenient and efficient interference-free coupling to the cathode follower circuit 61 and to the gated burst amplifier 61. The secondary winding 57 of transformer 55 has a relatively high impedance as compared with the impedance of primary 54, and the transformer steps up the chroma subcarrier components at the input of the cathode follower circuit so that these components are supplied with substantial amplitudes to the chroma demodulators in unit 23. Moreover, the chroma subcarrier components and reference bursts are stepped up in the autotransformer formed by inductance coil 59 to be impressed on the control grid of device 61 with appreciable amplitude.

The resistance-capacity input circuit 60, 62 of device 61 causes the peaks of the reference bursts to draw grid current so that the control grid of this device is established at zero bias by the reference bursts regardless of the actual intensity of these bursts. Device 61 is gated by impressing a gating signal on its screen electrode which consists of a series of gating pulses, with the timing of the gating pulse corresponding to the times of occurrence of the reference bursts so that only the bursts are translated by device 61. With this arrangement, device 61, when it is keyed on by the gating pulses impressed on its screen electrode, translates the reference bursts with maximum amplification to the anode, and there is no need precisely to adjust the amplitude of the gating pulses so as to pedestal the reference bursts to the cut-off threshold of device 61 as is the case where both are applied to the control grid, or where they are applied to the control grid and cathode of device 61.

As previously noted, the reference bursts occur with a fixed phase or timing displacement relative to the horizontal synchronizing pulses. Winding 65 derives a series of positive pulses corresponding in time to the horizontal synchronizing pulses between one side of the winding and the grounded intermediate tap, and it derives a series of negative pulses corresponding in time to the horizontal synchronizing pulses between the other side of the winding and the grounded tap. The negative pulses from winding 65 are differentiated by the resistance-capacity network 63, 66; and the positive portions of the differentiated pulses impressed on the screen of device 61 have the proper timing to cause device 61 to become conductive at the proper times to pass the reference bursts. (The negative portions have no effect.) The positive pulses from winding 65 are added to the positive portions of the differentiated pulses effectively to broaden the positive portions of the differentiated pulses so that each reference burst will be embraced in its entirety during the conductive intervals of device 61. A waveform such as shown at 70 is therefore impressed on the screen of device 61. This provides a convenient pulsed amplifier which will translate the reference bursts in their entirety and with maximum amplification to the automatic frequency control (AFC) circuit 68 even though the intensity of the bursts or the gating pulses may vary.

The AFC circuit 68 compares the bursts with the output signal from oscillator 31. This output signal is derived over lead 71, and it enables the AFC circuit to produce a direct current control voltage. This control voltage causes reactance tube circuit 69 to hold oscillator 31 synchronized as to frequency and phase with the reference bursts. This assures that the demodulating signals applied to unit 23 will have the proper phase and frequency to enable the chroma demodulators in that unit properly to perform their demodulating function.

The invention provides, therefore, an economical and efficient system in a color television receiver for deriving the reference bursts from the received color television signal, which system is not susceptible to picking up stray interfering signals, and which operates with a high degree of efficiency to translate the reference bursts in amplified form regardless of variation in the intensity of the bursts or the pulses used to gate a burst amplifier included in the system.

I claim:

1. In a color television receiver for utilizing a color television signal which includes at least one chroma subcarrier component and which also includes bursts of a reference signal component having a predetermined frequency and phase relation with the subcarrier component, which receiver includes a band-pass circuit for selecting the chroma subcarrier component and the reference signal bursts of a received color television signal, chroma demodulator means, generator means coupled to the demodulator means for supplying at least one demodulating signal thereto, and a gate circuit for supplying the reference bursts to the generator means to synchronize said generator with the received color television signal; the combination of an output transformer included in the band-pass circuit having a secondary winding of relatively low impedance as compared with the impedance of the primary winding thereof, a first input transformer for the chroma demodulator means having a primary winding of relatively low impedance as compared with the impedance of the secondary winding thereof, a second input transformer for the gate circuit having a primary winding of relatively low impedance as compared with the impedance of the secondary winding thereof, means for coupling said primary winding of said second input transformer in series with said primary winding of said first input transformer, and means for coupling said secondary winding of said output transformer to said series-connected primary windings of said input transformers.

2. In a color television receiver for utilizing a color television signal which includes at least one chroma subcarrier component and which also includes bursts of a reference signal component having a predetermined frequency and phase relation with the subcarrier component, which receiver includes a band-pass circuit for selecting the chroma subcarrier component and the reference signal bursts of a received color television signal, a chroma demodulator means, generator means coupled to the demodulator means for supplying at least one demodulating signal thereto, and a gate circuit for supplying the reference bursts to the generator means to synchronize the generator with the received color television signal; the combination of an output transformer included in the band-pass network with a secondary winding having one side connected to a point of reference potential and having low impedance as compared with the impedance of the primary winding thereof, an input transformer for the chroma demodulator means having a primary winding of relatively low impedance as compared with the impedance of the secondary winding thereof, an input inductance coil included in the gate network and having one side connected to said point of reference potential, a first connection extending between the ungrounded side of said secondary winding of said output transformer and one side of said primary winding of said input transformer, and a second connection extending between the other side of said primary winding of said input transformer and an intermediate tap on said input inductance coil.

3. In a color television receiver for utilizing a color television signal which includes at least one chroma subcarrier component and which also includes bursts of a reference signal component having a predetermined frequency and phase relation with the subcarrier component; the combination of a band-pass circuit for selecting the chroma subcarrier component and the reference signal bursts of a received color television signal and including an output transformer having a secondary winding of relatively low impedance as compared with the impedance of the primary winding thereof, chroma demodulator means including an input transformer having a primary winding of relatively low impedance as compared with the impedance of the secondary winding thereof, generator means coupled to the demodulator means for supplying at least one demodulating signal thereto, a gate circuit for supplying the reference bursts to the generator and including an input transformer having a primary winding of relatively low impedance as compared with the impedance of the secondary winding thereof, and means connecting said primary windings of said input transformers in series across said secondary winding of said output transformer, whereby a low impedance coupling circuit is provided for applying signals from said band-pass circuit to said chroma demodulator means and said gate circuit to minimize the pickup of stray interfering signals.

4. In a color television receiver for utilizing a color television signal which includes at least one chroma subcarrier component and which also includes bursts of a reference signal component having predetermined frequency and phase relation with the subcarrier component; the combination of a band-pass amplifier for selecting the chroma subcarrier component and the reference signal bursts and including an output transformer having a secondary winding of low impedance as compared with the impedance of the primary winding thereof, chroma demodulator means, a cathode-follower circuit for supplying the chroma subcarrier component to the chroma demodulator means and including an input transformer having a primary winding of relatively low impedance as compared with the impedance of the secondary winding thereof, generator means coupled to the demodulator means for supplying at least one demodulating signal thereto, a gated amplifier for supplying the reference bursts to the generator means to synchronize said generator with a received color television signal and including an input transformer having a primary winding of relatively low impedance as compared with the impedance of the secondary winding thereof, and means connecting said primary windings of said input transformers in series across said secondary winding of said output transformer, whereby a low impedance coupling circuit is provided for applying signals from said band-pass amplifier to said cathode follower circuit and said gated amplifier to minimize the pickup of stray interfering signals.

5. The combination set forth in claim 4 in which said gated amplifier includes an electron discharge device having a control electrode coupled to said input transformer thereof and further having a screen electrode, and means coupling said screen electrode to a gating signal source.

6. In a color television receiver for utilizing a color television signal which includes at least one chroma subcarrier component and which also includes synchronizing components and bursts of a reference signal component having a predetermined frequency and phase relation with the subcarrier component, and said bursts recurring with a selected phase with respect to said synchronizing components; the combination of a band-pass circuit for selecting the chroma subcarrier component and the reference signal bursts, chroma demodulator means coupled to the band-pass circuit for demodulating the chroma subcarrier component, generator means for supplying at least one demodulating signal to the chroma demodulator means, a sweep system for utilizing the synchronizing components and including an output transformer, a gating electron discharge device for supplying the reference bursts to the generator means for synchronizing the same and including a control electrode and a screen electrode, means for coupling said control electrode to the band-pass circuit, an inductive winding included on said output transformer and having an intermediate point connected to a point of reference potential, resistor means connecting said screen to said point of reference potential, capacitor means connecting one side of said inductive winding to said screen electrode, and means connecting the other side of said inductive winding to said screen electrode.

7. In a color television receiver for utilizing a color television signal which includes at least one chroma subcarrier component, and which also includes synchronizing components and bursts of a reference signal component having a predetermined frequency and phase relation with the subcarrier component, and said bursts recurring with a selected phase with respect to said synchronizing components, and which receiver includes a band-pass circuit for selecting the chroma subcarrier component and the reference signal bursts, chroma demodulator means coupled to the band-pass circuit for demodulating the chroma subcarrier component, generating means for supplying at least one demodulating signal to said chroma demodulating means, and a sweep system for utilizing the synchronizing components of the received color television signal and including an output transformer; a gating electron discharge device for supplying the reference bursts to said generator means and including a control electrode and a screen electrode, means for coupling said control electrode to said band-pass network, an inductive winding included on said output transformer having an intermediate tap connected to a point of reference potential for developing a series of negative pulses and a series of positive pulses having a selected phase with said reference bursts, resistor means connecting said screen electrode to said point of reference potential, capacitor means connecting one side of said inductive winding to said screen electrode to supply said negative pulses thereto in differentiated form, and resistor means for connecting the other side of said inductive winding to said screen electrode to supply said positive pulses thereto.

8. In a color television receiver for utilizing a color television signal which includes at least one chroma subcarrier component and which also includes bursts of a reference signal component having a predetermined frequency and phase relation with the subcarrier component, the combination of a band-pass circuit for selecting the chroma subcarrier component and the reference signal bursts of a received color television signal and including a low impedance output network, chroma demodulator means including an input transformer having a primary winding of relatively low impedance as compared with the impedance of the secondary winding thereof, generator means for supplying at least one demodulating signal to said demodulator means, a further input transformer having a primary winding of relatively low impedance as compared with the impedance of the secondary winding thereof, means connecting said primary windings of said input transformers in series across said output network to form a low impedance coupling circuit, a gating electron discharge device for supplying the reference bursts to said generator means and including a control electrode coupled to the secondary winding of said further input transformer and further including a screen electrode, a gating signal source, and means for supplying a gating signal from said source to said screen electrode, said low impedance coupling circuit minimizing the pickup of stray interfering signals.

References Cited in the file of this patent

UNITED STATES PATENTS

| | | |
|---|---|---|
| 2,594,380 | Barton | Apr. 29, 1952 |
| 2,653,187 | Luck | Sept. 22, 1953 |
| 2,714,132 | Fredendall | July 26, 1955 |

OTHER REFERENCES

Two-Color Direct View Receiver for the RCA Color Television System, November 1949.